United States Patent [19]

Reuter

[11] Patent Number: 5,299,358
[45] Date of Patent: Apr. 5, 1994

[54] MEASUREMENT DEVICE

[76] Inventor: David Y. Reuter, 32 Wellington Heights, Avon, Conn. 06001

[21] Appl. No.: 105,484

[22] Filed: Aug. 12, 1993

Related U.S. Application Data

[63] Continuation of Ser. No. 916,543, Jul. 20, 1992, abandoned.

[51] Int. Cl.$^5$ .............................................. G01B 3/08
[52] U.S. Cl. .................................. 33/494; 33/757; 33/760
[58] Field of Search ............... 33/476, 483, 489, 494, 33/756, 755, 757, 758, 759, 760, 764

[56] References Cited

U.S. PATENT DOCUMENTS

| | | | |
|---|---|---|---|
| 2,060,165 | 11/1936 | Borleske | 33/289 |
| 2,064,745 | 12/1936 | Harrie | 33/760 |
| 2,240,753 | 5/1941 | Bouchard et al. | 33/764 |
| 2,378,544 | 6/1945 | Fosse et al. | 33/494 |
| 2,459,554 | 1/1949 | Tomko | 33/494 |
| 2,514,455 | 7/1950 | Putnam | 33/758 |
| 2,742,705 | 4/1956 | Gelardi | 33/758 |
| 2,835,038 | 5/1958 | Perrin | 33/764 |
| 3,036,791 | 5/1962 | Siggelkow | 33/758 |
| 3,182,401 | 5/1965 | Stevens | 33/489 |
| 3,266,721 | 8/1966 | Barron | 33/430 |
| 3,845,565 | 11/1974 | Newswanger | 33/430 |
| 4,551,923 | 11/1985 | Sung | 33/476 |
| 4,641,436 | 2/1987 | Tzen et al. | 33/483 |
| 4,779,212 | 10/1988 | Levy | 33/755 |
| 4,989,341 | 2/1991 | Scotese | 33/759 |

FOREIGN PATENT DOCUMENTS

| | | | |
|---|---|---|---|
| 821557 | 10/1951 | Fed. Rep. of Germany | 33/494 |
| 2312756 | 12/1976 | France | 33/764 |
| 219691 | 6/1942 | Switzerland | 33/494 |
| 1320646 | 6/1987 | U.S.S.R. | 33/756 |

*Primary Examiner*—Thomas B. Will
*Attorney, Agent, or Firm*—Robert F. O'Connell

[57] ABSTRACT

A measurement device which includes a band of flexible material having measurement indicia and a zero reference marked thereon. The band is fixedly positioned on a surface on which the measurement is to be made so that at least a portion of the band and the zero reference are exposed. The band is arranged so that it can be moved so that the zero reference corresponds to a measurement reference point on the surface from which a measurement is to be made.

10 Claims, 2 Drawing Sheets

MEASUREMENT DEVICE

This is a continuation of copending application Ser. No. 07/916,543 filed on Jul. 20, 1992 now abandoned.

INTRODUCTION

This invention relates generally to measurement devices and, more particularly, to a measurement device which has a movable, zero reference line and which is both easy to use and more versatile in its use than current measurement devices of the same or similar types.

BACKGROUND OF THE INVENTION

Measurement devices, such as parallel rulers, T-squares, tape measures, and similar devices having measurement niduses printed thereon, utilize a fixed zero reference point, or line, so that when measurements from different reference positions along a linear distance are to be made, the entire measurement device must be moved so that its fixed zero reference point can be placed at each different reference position. Since the entire device must be moved each time, such operation often makes the use of the device extremely awkward or inconvenient. It is desirable to provide a device which does not have such a disadvantage.

BRIEF SUMMARY OF THE INVENTION

A measurement device in accordance with the invention comprises a device having a ruling strip, or tape, which has an easily movable zero reference point or line which can be moved in either direction along a linear distance without having to move the entire device The zero reference point can be readily moved to any position along the linear distance for measurement therefrom in either direction.

In accordance with a particular exemplary embodiment of the invention, the device includes a pair of canisters, or containers, each of which houses a portion of a continuous, flexible, clear plastic strip or tape-like element, each portion of which can be suitably coiled within and uncoiled from the canisters. Such strip element is made of a flexible, but distortion free, material and has measurement indicia, such as a ruled scale, printed thereon with a ruled zero reference line thereon positioned substantially at the mid-point of the strip. Suitable known photo techniques can be used to print the measurement indicia to a high degree of accuracy.

The canisters are appropriately held, as in a suitable frame, at an appropriate distance from each other so that the mid-point of the strip and sections of the ruled scale on each side thereof are exposed between the canisters. A pivotal gripping member, or handle, is positioned at the zero reference line of the strip, which member can be manipulated so that the zero reference line can be moved in either direction toward and away from each canister Thus, when the strip is placed along a line or distance on which measurements from different reference positions are to be made the zero reference line on the strip can be readily moved in one direction or another to the desired reference position each time without moving the overall device.

DESCRIPTION OF THE INVENTION

A particular preferred embodiment of the invention can be described with reference to the accompanying drawings wherein FIG. 1 shows a pair of canisters for use in a particular embodiment of the invention;

Figure 1:
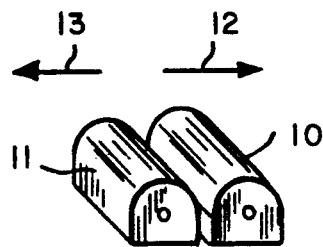
Figure 2:
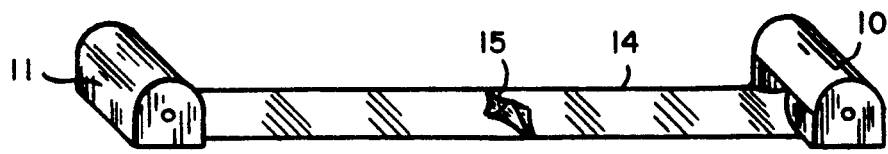
FIG. 2 shows such canisters and an exposed portion of a flexible measurement strip used therewith.

In accordance with a preferred embodiment of the invention, FIG. 1 depicts a pair of canisters 10 and 11 each of which has coiled within the interior thereof approximately one-half of a strip, or band, 14 of a flexible plastic material, a portion, or substantially all, of which strip can be exposed when the canisters are moved in opposite directions away from each other, as shown by arrows 12 and 13. In FIG. 2, for example, the canisters have been moved a selected distance from each other exposing a portion of the strip 14.

Strip 14 has a rotatable gripping member 15 suitably affixed thereto substantially at the mid-point of the strip, which position acts as a zero reference line, as discussed in more detail below. Rotatable gripping member 15 can be turned from the position shown in FIG. 2 to a position rotated therefrom by 90°.

Figure 3:
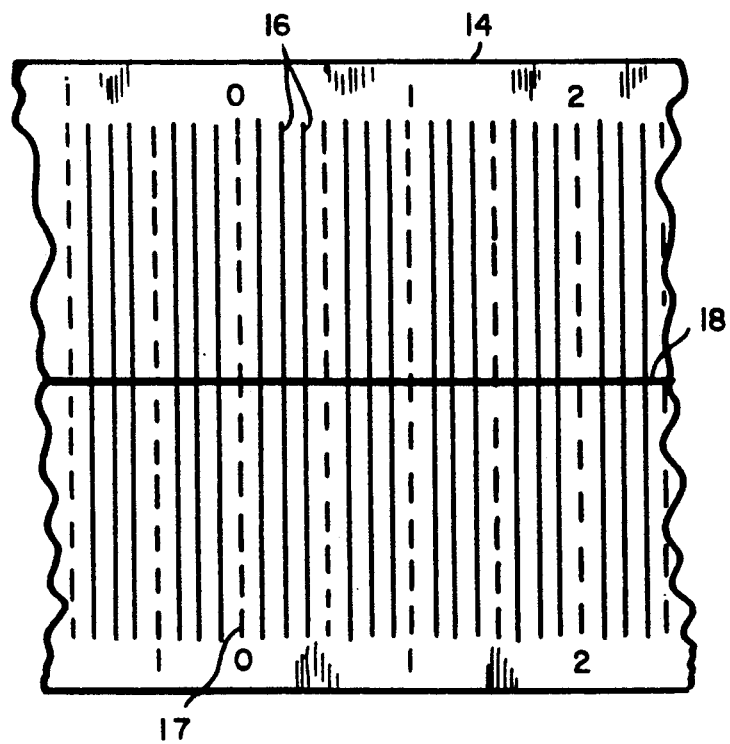
FIG. 3 shows a plan view of a portion of exemplary indicia imprinted on the flexible strip of FIG. 2.

A portion of the strip 14 about the mid-point is shown in FIG. 3. As can be seen therein, measurement indicia 16 are printed thereon, shown as a ruled scale marked, for example, in one-inch segments with one-eighth inch marking lines therebetween, accompanied by suitable reference numeral markings, as shown. The mid-point of the strip is identified as a zero-reference line, marked as "0" and having a dashed-line 17 which can be used as the zero reference line during measurements. A visually prominent center line 18 is printed in a longitudinal direction along the strip, mid-way between the edges thereof.

In a particular embodiment, for example, the strip may be arranged to permit measurements of up to 36 inches on either side of the zero reference line, the total length of the strip then being approximately 76 inches to allow for extra material at each end for insertion into and attachment to a suitable coiling mechanism within the canisters during assembly thereof. The strip may be made, for example, of a flexible plastic, such as that which is known to the art by the trade designation "Mylar". The measurement indicia are photo-printed on strip 14, for example, using extremely accurate art work prepared by computer. Such a process would be well-known to those in the art. Each end of strip 14 is suitably affixed to a well-known coiling mechanism in the canisters so that the strip can be easily moved into and out of each canister.

Figure 4:
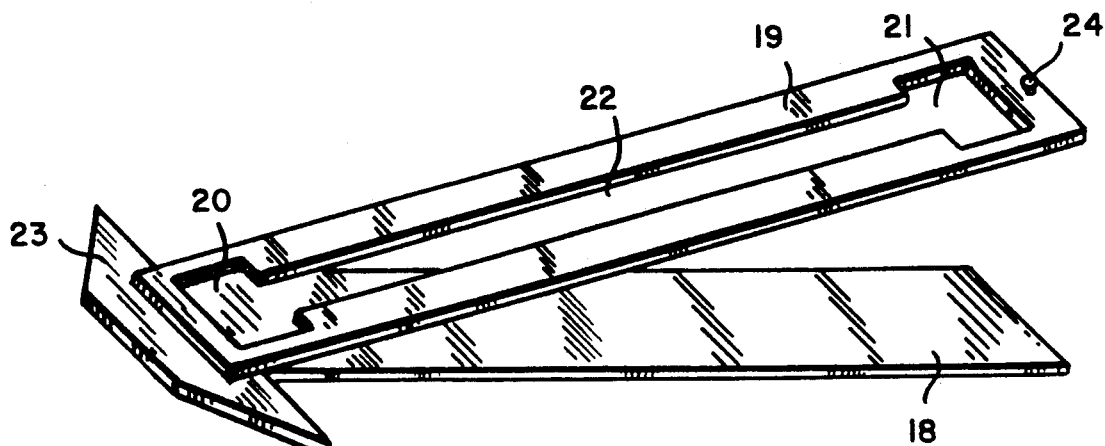
FIG. 4 shows a pictorial view of an exemplary frame portion of an embodiment of the invention.

For effective use of the canister/strip assembly, the assembly is preferably positioned in a suitable frame which holds the canisters at a selected distance from each other. One particular exemplary embodiment of such a frame is depicted in FIG. 4. As seen therein, the frame comprises a first rectangular member 18 and a second rectangular member 19 hinged attached to the first member at one end so that member 19 can be rotated upwardly and downwardly about the hinged end. Member 19 has rectangular openings 20 and 21 near each end thereof and a longer and narrower longitudinal opening or slot 22 therebetween. Member 18 is a solid piece of material and has a suitable handle 23 is attached at the hinged end thereof. Members 18 and 19 are preferably made of a transparent plastic material which is distortion-free, such as that made and sold under the trade designation "Lexan" by General Electric Company.

Figure 5:
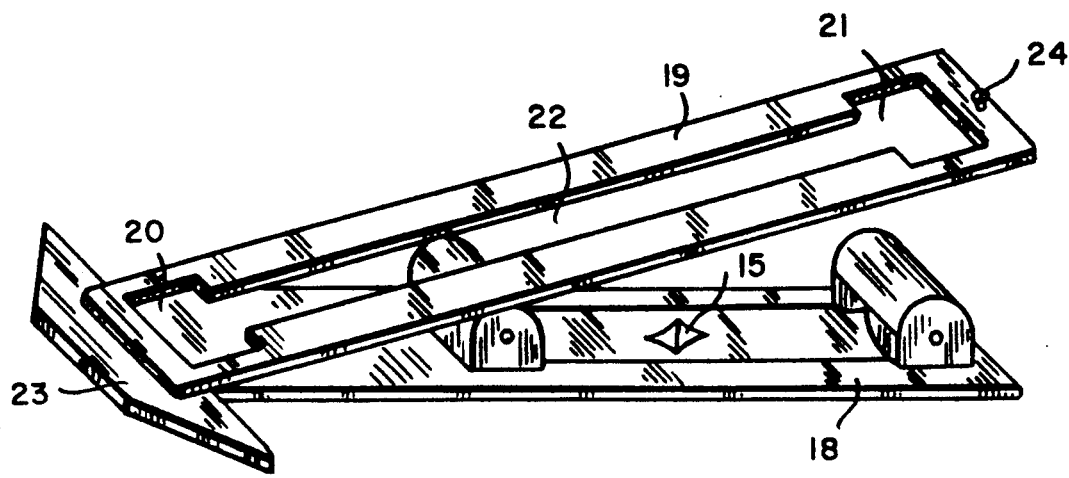
FIG. 5 shows a view in one position of an embodiment of the invention using the frame portion of FIG. 4 used with the canisters and flexible strip of FIG. 2.

The canisters are placed in the frame so that they are nested, respectively, in openings 20 and 21, the strip 14 being extended and exposed between them over opening 22. When the canisters are placed within the frame, gripping member 15 is rotated to a position which permits it to pass through the relatively narrow opening 22 (FIG. 5). Once the canisters have been set in position and hinged member 19 has been rotated downwardly so as to be positioned adjacent member 18 (FIG. 6), gripping member 15 can be rotated 90° so as to effectively retain the frame members in their positions adjacent one another, as shown. Hinged members 18 and 19 can be appropriately further locked together at the end ,opposite the hinged end thereof by a suitable clasp mechanism 24, for example.

Figure 6:
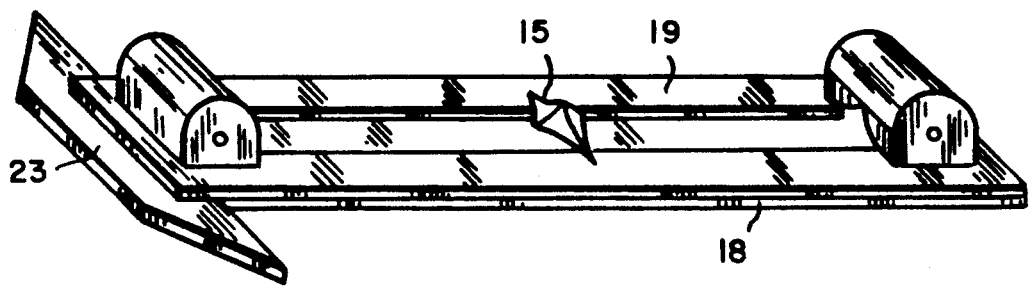
FIG. 6 shows a view in another position of the frame portion and the canisters and flexible strip of the embodiment of FIG. 5.

Once the overall device has been assembled as shown in FIG. 6, it is ready for use. During use, gripping member 15 can be moved longitudinally in slot 22 so that the zero reference line, and hence strip 14, can be readily moved along slot 22 so as to position the zero reference line at any point between the canisters so that measurements can be made in either direction from the movable zero reference line.

Once the zero reference gripping member has been positioned at its desired location, it can be locked in place in the slot 22 of horizontal member 19 using an suitable locking mechanism which would be known to those in the art. An appropriate locking mechanism, as used in drafting boards made and sold by Koh-I-Kor Corp. of Loomsbury, N.J., under Model No. 25433, for locking the head (Model No. 25445) can be used, for example.

The overall assembly can be readily placed and retained in any appropriate position on a surface on which measurements are to be made. Measurements can be easily made from any measurement reference point or line on such surface in either direction along a linear distance thereon by positioning the zero reference on band 14 so that it corresponds to the measurement reference point or line on the surface. Accordingly, the device is a conveniently usable tool for providing a convenient and accurate measurement of distances on a two dimensional surface.

The measurement indicia can be changed by substituting another canister/strip assembly on which the measurement indicia may be different (e.g. the indicia may be in centimeters and fractions thereof). The frame can be made so that the distance between the canisters can be any selected distance desired and the length of the strip determined accordingly. Means other than the specific frame depicted above may be used to hold the canisters at a selected distance apart, while still permitting the zero reference line to be easily moved therebetween by appropriate manipulation at a gripping member, or its equivalent, on the strip. Further, the members 18 and 19 may be partially mounted in a suitable manner on handle 23 so as to be rotatable to a selected angle relative thereto on the surface on which measurements are to be made.

The device of the invention can be used as a component in other available drafting equipment or mechanisms as a substitute for other measuring scales used therein. For example, the device can be used in a Vemco Drafting Machine made and sold by Vemco Corporation of San Demis, Calif. under the model descriptions V-Track 520 or V-Track 612. The device of the invention can be suitably attached to the base plate thereof in a manner substantially similar to that in which the scale device, currently used in such machine, is attached.

Still other modifications of the invention may occur to those in the art within the spirit and scope thereof. Hence, the invention is not to be construed as limited to the particular embodiment described above, except as defined by the appended claims.

What is claimed is:

1. A measurement device comprising a band of flexible transparent material having a zero reference marked substantially at the center thereof and having further measurement indicia marked thereon and having further measurement indicia marked thereon on either side of said zero reference;

means for positioning said band on a surface on which a measurement is to be made said positioning means including a pair of containers within which the ends of said bank of material are mounted, said containers being movable relative to each other; and means associated with said containers for permitting said containers to be positioned on said surface relative to each so that at least a portion of said band having said zero reference and at least portions of said further measurement indicia thereon are exposed;

gripping means attached to said band at said zero reference for moving said band on said surface so that said zero reference can be positioned to correspond to a measurement reference point on said surface from which a measurement can be made from either side of said zero reference.

2. A measurement device in accordance with claim 1 wherein the portions of said flexible band on either side of said reference that are not exposed between said containers are respectively retained within said containers.

3. A measurement device in accordance with claim 1 wherein the means associated with said containers includes frame means having container retaining means, said containers being positioned on said container retaining means at fixed positions relative to each other so that a selected portion of said band including said zero reference is exposed therebetween.

4. A measurement device in accordance with claim 3 wherein said frame means includes a pair of recesses at fixed positions relative to each other, said containers being respectively positioned with said recesses.

5. A measurement device in accordance with claim 4 wherein said frame means includes
a first base member;
a second member hingedly attached at one end to said base member, said second member having said recesses formed therein.

6. A measurement device in accordance with claim 5 wherein said second member further includes an elongated slot formed between said pair of recesses, the exposed portions of said band between said containers being visible in said elongated slot.

7. A measurement device in accordance with claim 6 wherein said gripping member is movable in said elongated slot so as to move the zero reference of said band between said containers.

8. A measurement device in accordance with claim 7 wherein said gripping member is pivotally attached to said flexible band.

9. A measurement device in accordance with claim 5 in which said first base member and said second member are transparent.

10. A measurement device in accordance with claim 7 and further including means for locking said gripping member at said measurement reference point when said member has been moved to a said measurement reference point between said containers.